(12) United States Patent
Schroeder et al.

(10) Patent No.: US 6,227,606 B1
(45) Date of Patent: May 8, 2001

(54) ENGINE HOOD ASSEMBLY

(75) Inventors: Del C. Schroeder, Bloomfield Hills; John G. Argeropoulos, Sterling Heights; Russell C. Fielding, Clarkston, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/392,940

(22) Filed: Sep. 9, 1999

(51) Int. Cl.$^7$ ....................................................... B60J 1/08
(52) U.S. Cl. ........................ 296/146.1; 296/191; 296/901
(58) Field of Search ................... 296/146.1, 191, 296/901; 180/76, 69.2; 16/DIG. 43

(56) References Cited

U.S. PATENT DOCUMENTS

| | | |
|---|---|---|
| 4,438,971 * | 3/1984 | Zaydel et al. .......................... 296/191 |
| 4,598,008 | 7/1986 | Vogt et al. . |
| 4,626,023 | 12/1986 | Lutz . |
| 4,803,108 | 2/1989 | Leuchten et al. . |
| 4,898,419 | 2/1990 | Kenmochi et al. . |
| 4,906,508 | 3/1990 | Blankenburg et al. . |
| 4,917,742 | 4/1990 | Watanabe et al. . |
| 4,950,522 * | 8/1990 | Vogt et al. ............................. 296/191 |
| 5,140,913 * | 8/1992 | Takeichi et al. ....................... 296/191 |
| 5,186,509 * | 2/1993 | Tyves .................................... 296/901 |
| 5,226,695 * | 7/1993 | Flint et al. ............................. 296/191 |
| 5,242,192 * | 9/1993 | Prescaro et al. ...................... 280/730 |
| 5,291,990 * | 3/1994 | Sejzer ..................................... 206/45 |
| 5,322,722 * | 6/1994 | Rozenberg ............................ 296/191 |
| 5,344,208 * | 9/1994 | Bien et al. ............................ 296/187 |
| 5,518,769 | 5/1996 | Tsotsis . |
| 5,567,499 | 10/1996 | Cundiff et al. . |
| 5,569,508 | 10/1996 | Cundiff . |
| 5,605,371 * | 2/1997 | Borchelt et al. ...................... 296/188 |
| 5,664,397 * | 9/1997 | Holz ..................................... 296/191 |
| 5,820,201 * | 10/1998 | Jabalee ................................. 296/901 |
| 5,849,122 | 12/1998 | Kenmochi et al. . |
| 5,966,874 * | 10/1999 | Repp et al. ............................. 49/398 |

* cited by examiner

Primary Examiner—Joseph D. Pape
Assistant Examiner—Kiran B. Patel
(74) Attorney, Agent, or Firm—Mark P. Calcaterra

(57) ABSTRACT

A vehicle body panel having an outer skin and an inner skin. The inner skin and outer skin are connected by an intermediate spacer. A urethane foam is provided between the intermediate spacer and each of the inner and outer skins.

10 Claims, 3 Drawing Sheets

ENGINE HOOD ASSEMBLY

BACKGROUND OF THE INVENTION

1. Field of the Invention

The present invention relates to an engine hood assembly and, more particularly, to a body panel having an inner and outer skin interconnected by a light weight spacer in order to provide sufficient structural support to the body panel.

2. Discussion

Present automotive vehicle body panels typically include inner and outer skins each stamped of a sheet metal. The outer skin provides a decorative appearance to the vehicle, while the inner skin provides additional structural support. Typically, the inner and outer skins are interconnected by hemming the outer skin over the edges of the inner skin, thereby forming a unitary vehicle body panel. Although such body panel construction has been utilized for an extensive period, automotive designers continuously strive to reduce vehicle weight and cost and to improve the structural capabilities of the body panels.

Thus, it is an object of the present invention to provide a vehicle body panel which reduces the weight of a comparably sized conventional body panel.

It is a further object of the present invention to provide a body panel having an outer skin formed of a metal or composite material interconnected to an inner skin formed of a thin, flexible material, where the inner and outer skins are joined by a honeycombed spacer.

SUMMARY OF THE INVENTION

This invention is directed to a body panel for a vehicle. The body panel includes an outer skin and an inner skin. A structural spacer interconnects the inner and the outer skins and is bonded to both the inner skin and the outer skin. The structural spacer is formed of a material which is lighter in weight than both the inner and the outer skins. A foam bonding material is interposed between the structural spacer and the inner and outer skins. The foam bonding material bonds the structural spacer to the inner and outer skins.

These and other advantages and features of the present invention will become readily apparent from the following detailed description, claims and drawings.

BRIEF DESCRIPTION OF THE DRAWINGS

The drawings, which form an integral part of the specification. are to be read in conjunction therewith, and like reference numerals are employed to designate identical components in the various views.

DETAILED DESCRIPTION OF THE INVENTION

Figure 1:
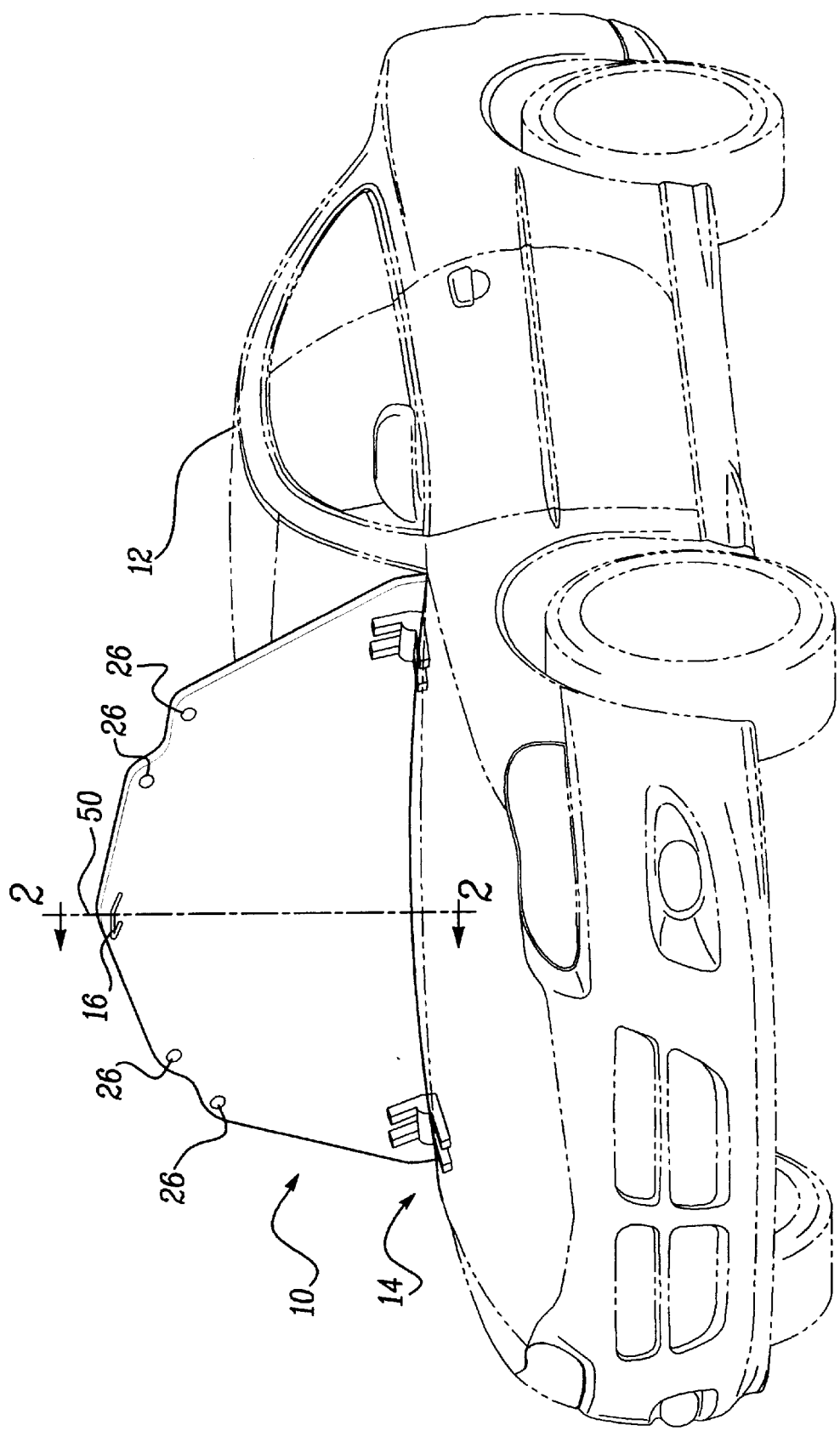
FIG. 1 is a perspective view of a portion of a vehicle and hood arranged in accordance with the principles of the present invention.
Figure 2:
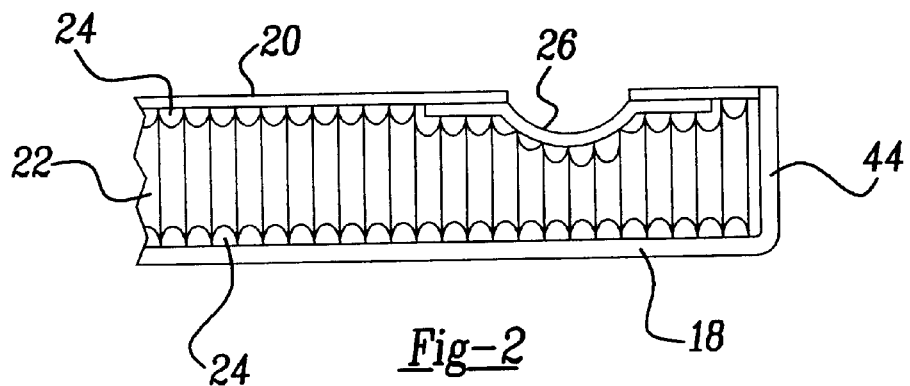
FIG. 2 is a cross-sectional view through line 2—2 of FIG. 1.

With reference to FIGS. 1–8, the engine hood assembly 10 will be described. The engine hood assembly 10 will be described as an exemplary configuration for any of a number of vehicle body panels, include a deck lid, roof front and rear fenders, and vehicle doors. Engine hood assembly 10 attaches to a vehicle 12 via a hinge assembly 14. The hinge assembly 14 enables the engine hood assembly 10 to pivot between an open position, as shown in FIG. 1, and a closed position. A tie-down latch assembly 16 retains engine hood assembly 10 in a generally closed position, and release of a latch mechanism enables engine hood assembly 10 to pivot to an open position FIG. 2 depicts a cross-sectional view of a portion of engine hood assembly 10. Engine hood assembly 10 comprises a multi layer structure including an outer skin 18 and an inner skin 20. Outer skin 18 and inner skin 20 are interconnected by an intermediate layer or intermediate spacer 22. A bonding medium 24 is introduced between outer skill 18 and intermediate layer 22. Similarly, a bonding medium 24 is introduced between inner skin 20 and intermediate layer 22. FIG. 2 also depicts an exemplary poise button 26 which is inserted between inner skin 20 and intermediate layer 22 and bonded in position via bonding medium 24. Poise button 26 disperses an applied load across a greater surface area of intermediate layer 22, thereby providing greater support to place the hood in a poised position.

Preferably, outer skin 18 is formed of a metal of a preferred thickness of 0.7 to 1.0 mm or composite material having 2.0 to 3.0 mm thickness, such as through injection molding. Inner skin 20 is preferably formed of a thin sheet of flexible material such as sheet stock, aluminum or steel stamping, foil stock of between 0.005" to 0.018" thickness, or plastic injection molding. Poise button 26 is formed of aluminum material having a thickness between 0.040" and 0.060". Intermediate layer 22 is preferably a one inch phenolic impregnated paper spacer having a honeycomb structure, but may be a plastic or metal material (honeycomb). Intermediate layer 22 preferably is formed to provide adequate structural support to engine hood assembly 10, for resisting denting or other deformation under load. Bonding medium 24 preferably is a polyurethane foam material.

During assembly of engine hood assembly 10, bonding medium 24 is sprayed on both interior surfaces of outer skin 18 and inner skin 20. Outer skin 18, inner skin 20, and intermediate layer 22 are then placed in a fixture for assembly. The polyurethane foam free rises into the paper honeycomb to fuse and secure the phenolic impregnated paper honeycomb or other plastic or metal materials to both the inner surfaces of outer skin 18 and inner skin 20. Further, use of free rise urethane foam provides a dead air space which functions as an insulator for engine hood assembly 10.

Figure 3:
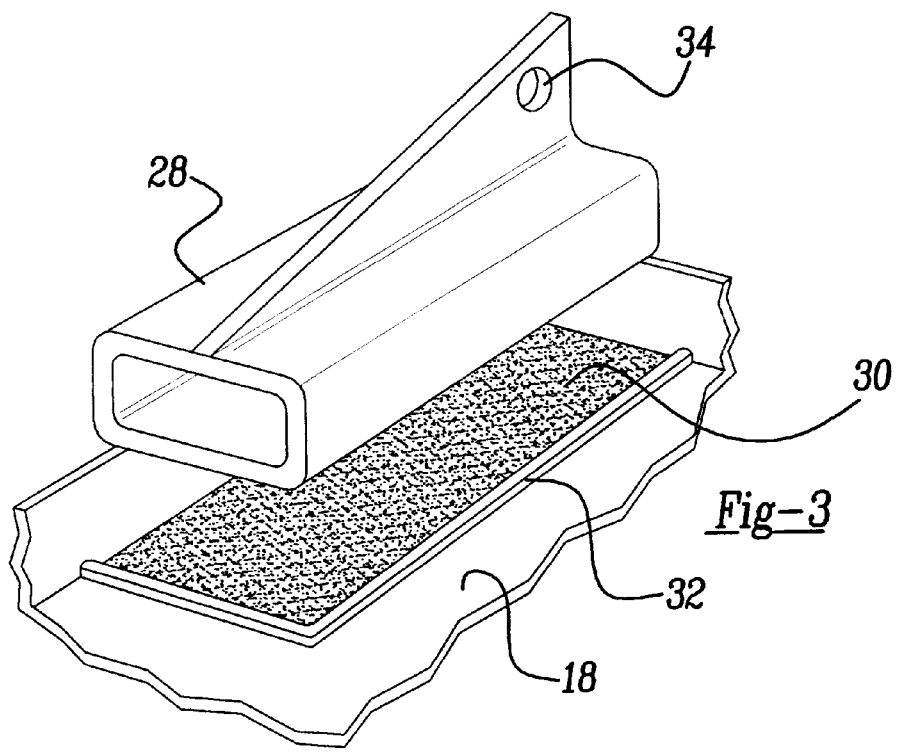
FIG. 3 is an exploded view of the interconnection between a hinge pivot bracket and the outer skin of the body panel.

FIG. 3 depicts an interconnection between outer skin 18 and a hinge bracket 28 of hinge assembly 14. Hinge bracket 28 interconnects directly to the inner surface of outer skin 18 via an adhesive layer 30. A locating line or rib 32 may be formed on the inner surface of outer skin 18 to facilitate positioning of hinge bracket 28. Preferably hinge bracket 28 is formed of an extruded aluminum material and includes a pivot hole 34 which enables hinge bracket 28 to pivot about the pivot point for engine hood assembly 10.

Figure 4:
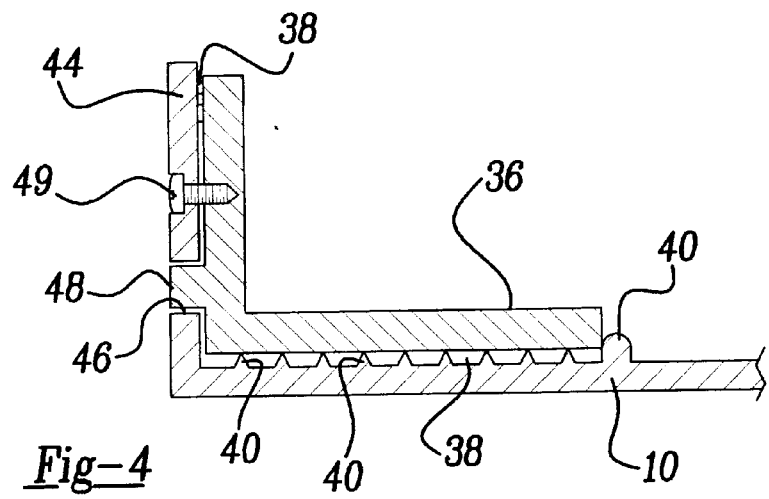
FIG. 4 is a cross-sectional view of the interconnection between the latch bracket and the outer skin.

FIG. 4 depicts a cross-sectional view of an interconnection between tie down bracket 36 of hinge assembly 14 and outer skin 18. Tie down bracket 36 and outer skin 18 are preferably interconnected using an adhesive bond 38. Preferably, one or a plurality of ribs 40 are formed on an inner surface of outer skin 18. The ribs 40 provide separation between tie down bracket 36 and the surface of outer skin 18 in order to prevent the adhesive material forming adhesive bond 38 from being squeezed out from between tie down bracket 36 and outer skin 18. Preferably, tie down bracket 36 is a die cast piece or steel stamping.

Figure 5:
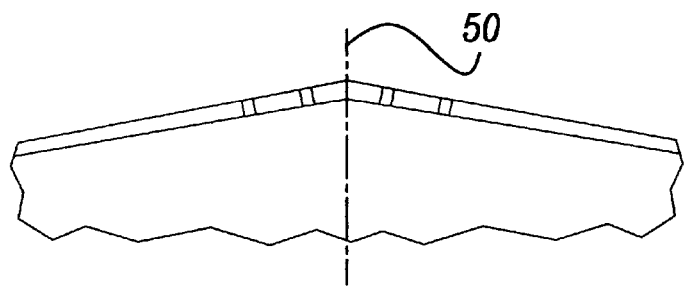
FIG. 5 is a cross-sectional view of an exemplary configuration for the flange portion of the hood.

As best seen in FIGS. 2 and 4, outer skin 18 includes a flange 44 which projects generally downward from outer skin 18. Flange 44 includes a hole 46 which receives a stud 48 projecting from tie down bracket 36. Stud 48 prevents a peal type breakdown of the adhesive bond. Alternatively, a fastener 49 can be employed alternatively or in conjunction with stud 48 to prevent such breakdown. As best seen in FIG. 5, flange 44 may be formed thicker in proximity to a center line 50 of the vehicle in order to augment the retaining force of hole 46. For example, flange 44 may taper from 0.050" along the center line to 0.030" at its end.

Figure 6:
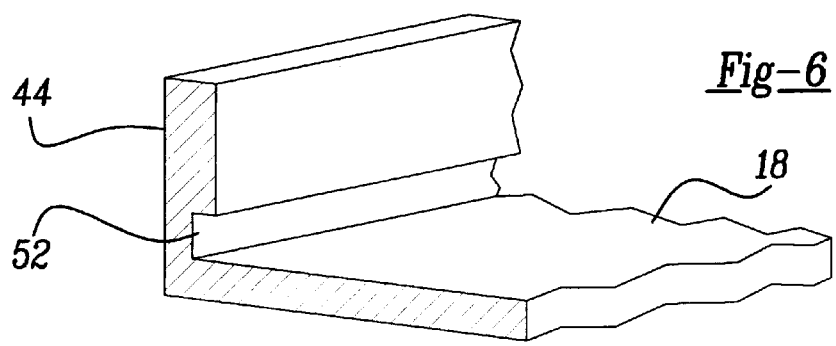
FIG. 6 is a perspective view of the outer skin configured in a first embodiment for regaining the latch bracket.
Figure 7:
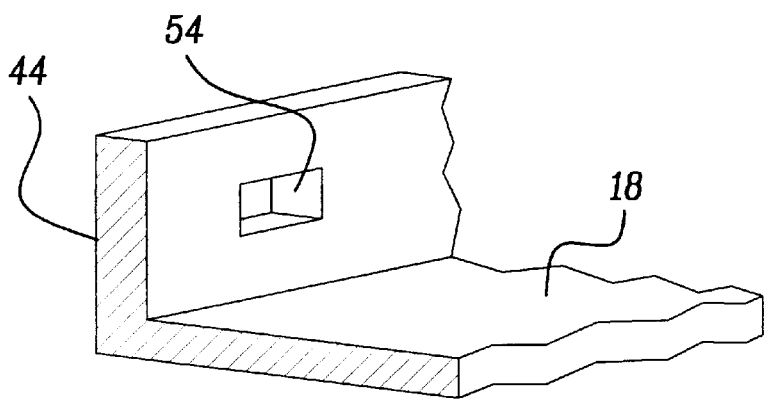
FIG. 7 is a perspective view of the outer skin configured in a second embodiment for retaining the latch bracket.
Figure 8:
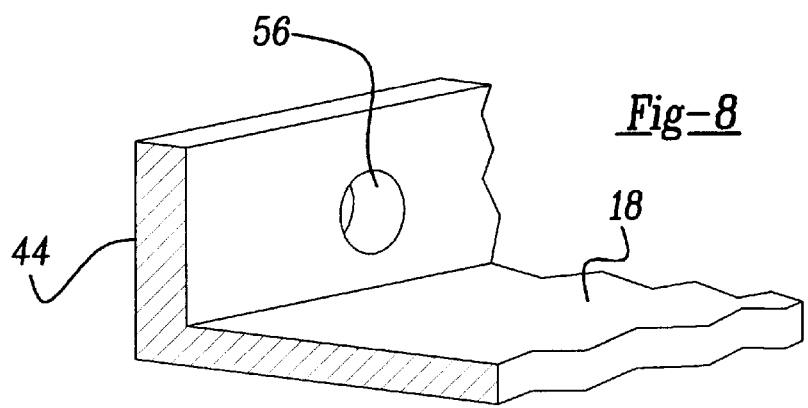
FIG. 8 is a perspective view of a third embodiment of the flange for retaining the latch bracket.

FIG. 6 depicts a second configuration for outer skin 18 and flange 44 to receive a tie down bracket 36. Flange 44 is formed with an undercut 52 which provides a channel for receiving tie down bracket 36. As shown in FIG. 7, flange 44 of outer skin 18 may include a rectangular undercut 54. Alternatively, undercut 54 may be formed in a circular manner. As best seen in FIG. 8, flange 44 in outer skin 18 may include a circular through hole 56.

It should be noted that tie down bracket 36 must be configured so that stud 48 aligns with the respective undercuts and holes described in FIGS. 6–8. It should also be noted that in FIGS. 6–8, flange 44 has a thickness greater than the decorative portion of outer skin 18.

In view of the foregoing, one skilled in the art will recognize that the engine hood assembly 10 described herein meets the objects of the subject invention. In particular, engine hood assembly defines a body panel which is light in weight, but provides sufficient structural support required of body panels. Further, engine hood assembly 10 provides greater vehicle insulation, both thermal and acoustical, for the vehicle.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed:

1. A body panel for a vehicle comprising:
an outer skin;
an inner skin formed of a flexible, foil material;
an intermediate layer interconnecting the inner skin and the outer skin, the intermediate layer being bonded by a bonding material to both the inner and the outer skins; and
a load dispersing pad formed on an inner skin surface of the intermediate layer, the load dispersing pad adapted for contacting a corresponding body panel support surface.

2. The apparatus of claim 1 wherein the intermediate layer is formed of a material which is lighter in weight than both the inner and the outer skin.

3. The apparatus of claim 1 further comprising a foam bonding material interposed between the intermediate layer and the inner and outer skins, the foam bonding material bonding the intermediate layer to the inner and outer skins.

4. The apparatus of claim 1 further comprising a hinge bracket interconnected to the outer skin, the mounting bracket being interconnected to the outer skin via an adhesive.

5. The apparatus of claim 4 further comprising a plurality of ribs formed between the hinge bracket and the outer skin to provide a space for the adhesive.

6. The apparatus of claim 1 wherein the outer skin is an injection molded plastic.

7. The apparatus of claim 1 wherein the intermediate layer is formed of paper having a honeycomb structure.

8. The apparatus of claim 1 further comprising a urethane foam, the urethane foam bonding the inner and outer skins are bonded to the intermediate layer.

9. The apparatus of claim 1 wherein the inner skin is formed of foil stock having a thickness of between 0.005 and 0.018 inches.

10. The apparatus of claim 9 wherein the outer skin is formed of one of a metal having a thickness between 0.7 and 1.0 millimeters and a composite material having a thickness between 2.0 and 3.0 millimeters.

* * * * *